United States Patent
Kamariotis (10) Patent No.: US 7,425,981 B2
(45) Date of Patent: Sep. 16, 2008

(54) VIDEO PRE-PROCESSING

(75) Inventor: Othon Kamariotis, Athens (GR)

(73) Assignee: British Telecommunications plc, London EC1A (GB)

(*) Notice: Subject to any disclaimer, the term of this patent is extended or adjusted under 35 U.S.C. 154(b) by 642 days.

(21) Appl. No.: 10/516,952

(22) PCT Filed: Jun. 12, 2003

(86) PCT No.: PCT/GB03/02528

§ 371 (c)(1),
(2), (4) Date: Dec. 6, 2004

(87) PCT Pub. No.: WO03/107677

PCT Pub. Date: Dec. 24, 2003

(65) Prior Publication Data

US 2005/0185045 A1   Aug. 25, 2005

(30) Foreign Application Priority Data

Jun. 12, 2002   (EP)   .................................. 02254105

(51) Int. Cl.
*H04N 7/14* (2006.01)
(52) U.S. Cl. .................. 348/14.13; 348/14.15
(58) Field of Classification Search ............. 348/14.13, 348/14.12, 14.01, 420.1, 14.15; 382/242, 382/243, 173
See application file for complete search history.

(56) References Cited

U.S. PATENT DOCUMENTS

| | | | |
|---|---|---|---|
| 5,881,183 A | 3/1999 | Lee | |
| 5,896,176 A | 4/1999 | Das et al. | |
| 6,452,970 B1 | 9/2002 | Kaup | |
| 6,496,607 B1 * | 12/2002 | Krishnamurthy et al. | ..... 382/282 |
| 6,584,229 B1 * | 6/2003 | Lim et al. | ................... 382/243 |
| 2001/0019631 A1 * | 9/2001 | Ohsawa et al. | ............... 382/242 |
| 2002/0191846 A1 * | 12/2002 | Crinon et al. | ................ 382/173 |
| 2004/0070666 A1 * | 4/2004 | Bober et al. | ............. 348/14.01 |

FOREIGN PATENT DOCUMENTS

| | | |
|---|---|---|
| EP | 0330455 A2 | 8/1989 |
| EP | 0476603 A2 | 3/1992 |
| EP | 0635981 A | 1/1995 |
| WO | WO 99/22518 | 5/1999 |

OTHER PUBLICATIONS

Luo et al., "Deformable Human Head Contour Tracking by Incorporating a Matching Process and an Active Contour Model", Conference Proceedings Dicta. Digital Image Computing:Techniques and Applications, vol. 1, 1993, pp. 195-202, XP000912067.
Guo et al., "Fast and Adaptive Semantic Object Extraction From Video", Proceedings of the SPIE, SPIE, Bellingham, VA, US, vol. 3974, Jan. 25, 2000, pp. 440-451, XO008014683.

* cited by examiner

*Primary Examiner*—Stella L Woo
(74) *Attorney, Agent, or Firm*—Nixon & Vanderhye PC (57) ABSTRACT

A foreground object part is distinguished from a substantially static background part of each videoframe within a video sequence. Each video frame is divided into a number of video blocks each of which comprises one or more pixels. A mask frame is generated in respect of each video frame, each mask frame having a mask block corresponding to each video block in each respective video frame. Each mask block is then set to either an object value, indicating that the corresponding video block in the corresponding video frame includes one or more pixels depicting a foreground object part, or to another value.

10 Claims, 5 Drawing Sheets

VIDEO PRE-PROCESSING

BACKGROUND

1. Technical Field

This application is the US national phase of international application PCT/GB03/02528 filed 12 Jun. 2003 which designated the U.S. and claims benefit of EP 02254105.6, dated 12 Jun. 2002, the entire content of which is hereby incorporated by reference.

The present invention relates to a method and apparatus for pre-processing a video sequence and, in particular, to pre-processing a video sequence prior to transmitting it over a packet switched data network using a protocol such as MPG-4.

2. Related Art

A video sequence comprises a sequential series of complete video frames intended to be displayed successively at a predetermined rate. Each frame comprises a matrix of pixels, each of which has, in the case of black and white video, an associated value indicating the brightness of the pixel, or, in the case of colour video, an associated triplet of values which together indicate both the brightness and the colour of each pixel.

A very common type of video sequence is one in which a single object (eg a person) moves in the foreground against a substantially static background. For example, a video teleconference in which two people sit in front of their respective computers with small cameras transmitting to one another video images of their faces (as well as audio information) will typically fall into this category of video sequence.

The present inventor has realised that in video sequences of this type, the most important aspect of the video sequence tends to be the object moving in the foreground. That is to say, inaccuracies, poor rendering or noise (ie a poor signal to noise ratio) tends to be more noticed by a viewer when it occurs within the foreground object.

SUMMARY

According to a first aspect of the present invention, there is provided a method of transmitting a video sequence across a non-ideal transmission channel in which a distinction is made between a foreground object part and a substantially static background part of each video frame within the sequence and the background part is transmitted at a lower quality than the object part.

The term quality as used herein includes the accuracy with which the videoed scene is portrayed, the resolution at which it is portrayed and the rate at which the depicted scene is updated, etc. Thus, according to the present invention, if there are limitations on the transmission channel through which a video sequence is to be sent (in terms of bandwidth, noise, loss of data, etc.) a viewer watching the received video sequence will tend to have a better viewing experience since better quality in the foreground object is achieved at the expense of the quality of the background, which, as mentioned above, is considered by the present inventor to contribute less strongly to the overall viewing experience of the viewer.

Preferably, the background part is transmitted at a lower update rate than the foreground object part. This is advantageous because the resultant reduction in quality of the background part is least likely to give rise to a reduced subjective viewing experience compared with other ways of reducing the bandwidth used to transmit the background part (and thus reducing the quality of the background part).

According to a second aspect of the present invention, there is provided a method of distinguishing between a foreground object part and a substantially static background part of each video frame within a video sequence, the method comprising the steps of:

dividing each video frame into a number of video blocks each of which comprises one or more pixels;

generating a mask frame in respect of each video frame, each mask frame having a mask block corresponding to each video block in each respective video frame; and either setting each mask block to an object value, indicating that the corresponding video block in the corresponding video frame includes one or more pixels depicting a foreground object part, or setting each mask block to another value; wherein a mask boundary is defined in respect of each mask frame such that each mask block within the mask boundary is set to an object value whilst each mask block outside the boundary is set to another value, and wherein the mask boundary position is varied between mask frames, according to a stepped procedure, towards a position in which the boundary just encompasses the foreground object part, of the corresponding video frame, as determined by comparing the corresponding video frame with a substantially temporally adjacent video frame.

Preferably, each video block comprises sixteen by sixteen pixels. Video blocks of this size may hereinafter be referred to as macro-blocks.

According to one embodiment, each mask block can be set to either one of two possible values to indicate that the respective block is either an object block, in which case one or more of the pixels in the corresponding video block are considered to be object pixels, or a background block, in which case all of the one or more pixels in the corresponding video block are considered to be background pixels. In other embodiments, however, intermediate values may be used to indicate a degree of transparency of one or more pixels within the corresponding video block.

By stepped procedure, it is meant that the mask boundary may only be shrunk or expanded between successive mask frames by up to a predetermined maximum amount. Thus in one embodiment, each portion of the mask boundary can only be moved by up to two blocks away from the position of the corresponding portion of the mask frame in a preceding or successive mask frame.

According to a preferred embodiment of the present invention, the method of distinguishing between a foreground object part and a substantially static background part of each video frame within a video sequence comprises the steps of:

dividing each video frame into a number of video blocks each of which comprises one or more pixels;

generating a mask frame in respect of each video frame, each mask frame having a mask block corresponding to each video block in each respective video frame; and either setting each mask block to an object value, indicating that the corresponding video block in the corresponding video frame includes one or more pixels depicting a foreground object part, or setting each mask block to another value; wherein the steps of generating each mask frame and setting each mask block comprise the following sub-steps:

a) selecting a first one of said video frames and setting it to be a past video frame;

b) generating a first mask frame corresponding to said first video frame, setting the first mask frame as a past mask frame and associating it with an initial mask boundary;

c) setting all mask blocks within the initial mask boundary to an object value;
d) selecting a subsequent one of said video frames which is substantially temporally adjacent to said past video frame and setting it as the current video frame;
e) comparing each pixel or group of pixels within said past video frame with each corresponding pixel or group of pixels within said current video frame and marking each pixel or group of pixels of said current video frame which differs from its corresponding pixel or group of pixels in said past video frame by more than a predetermined amount as a changed pixel or group of pixels;
f) determining where the most outwardly located changed pixel or group of pixels in each of a plurality of directed regions is located;
g) setting each portion of a current mask boundary associated with each respective directed region to a position which is either equal to the position of the corresponding portion of the current mask boundary or up to a predetermined maximum integer number of blocks away from the position of the corresponding portion of the current mask boundary towards the corresponding position of the most outwardly located changed video block in the respective directed region in said current video frame;
h) setting all mask blocks in the current mask frame which are located within the current mask boundary to an object value;
i) setting the current video frame and the current mask frame to be the past video frame and past mask frame respectively; and
j) repeating sub-steps d) to i) until a mask frame has been generated in respect of each of the video frames in the video sequence.

Preferably, the first video frame which is selected is the video frame which is intended to be displayed first in the video sequence, and each subsequent video frame which is selected is the video frame which is intended to be displayed next in th sequence, etc. However, in some circumstances, it may be advantageous to perform the processing backwards (ie starting from the last video framer to be displayed) or to skip intermediate frames (ie only processing every second, third fourth, etc. frame), or to divide the sequence into mini sequences, possibly overlapping, etc.

According to a further aspect of the present invention, there is provided a method of setting a region of interest in each of a sequence of video frames, each video frame comprising a plurality of pixel values, the method including, in respect of each video frame following a predetermined number of initial frames:

generating in respect of each video frame an instantaneous region of interest;
determining whether, and if so to what extent, to modify the region of interest set for the preceding video frame, in order to determine the region of interest for the currently considered video frame, according to a stepped procedure; and
setting the region of interest of the currently considered video frame in accordance with the result of the determination performed according to the stepped procedure; wherein
the stepped procedure includes comparing a first boundary defining the instantaneous region of interest of the currently considered frame, or sections thereof, with a second boundary defining the region of interest set for the preceding frame, or corresponding sections thereof, and if the difference is greater than a threshold amount, modifying the second boundary, or sections thereof, in the direction towards the first boundary, or the corresponding sections thereof, by an amount which is constrained to be equal to or below a maximum step amount.

In this way, a video encoder which takes advantage of the specified region of interest to enable a greater subjective image quality of the finally viewed video sequence to be achieved by sending the region of interest data at a higher quality than the rest of the data, will not be required to make rapid large changes in the quality of the region of interest data transmitted (as a result of a rapid change in the size of the region of interest) which results in an enhanced subjective image quality of the finally viewed video sequence compared to a case where such rapid changes are not so restricted.

Preferably, the method set out above is applied to the second and each subsequent frame within the video sequence. Preferably a region of interest in respect of the first frame of the video sequence is set to equal the entirety of the first video frame.

Preferably, the method by which an instantaneous region of interest is determined includes comparing the respective video frame with its temporally adjacent preceding frame and detecting differences between the pixel values of these frames. However, alternative methods such as that described in EP 0 635 981 based on detecting a region of skin could be used instead. Alternatively, more advanced methods such as the "morphological close operation" described in U.S. Pat. No. 5,896,176 could be used, however these are not preferred as they are much more processor intensive than the preferred method described in greater detail below.

Preferably, the stepped procedure will not cause a section of the boundary of the region of interest to be modified unless the difference between the section of the boundary of the set region of interest of the preceding frame and the corresponding section of the boundary of the instantaneous region of interest of the currently considered frame is greater than 2 pixels. However, in alternative embodiments this figure could be set to zero or any other value. Additionally, the value could vary depending upon which section is being considered, whether the instantaneous boundary is inside or outside the preceding set region boundary, whether some condition such as that the frame is later than the $n^{th}$ frame, etc.

Preferably, when it is determined that a section of the boundary of the set region of interest should be modified, it is modified by a step amount. Preferably, the value of the step amount varies in dependence upon a number of factors including the section of the boundary, the direction in which the change is to be made, relative to the centre of the frame, and whether or not some specified condition has been met leg whether the frame is later than the $n^{th}$ frame etc.).

BRIEF DESCRIPTION OF THE DRAWINGS

In order that the present invention may be better understood, embodiments thereof will now be described, by way of example only, with reference to the accompanying drawings in which.

DETAILED DESCRIPTION OF EXEMPLARY EMBODIMENTS

Figure 1:
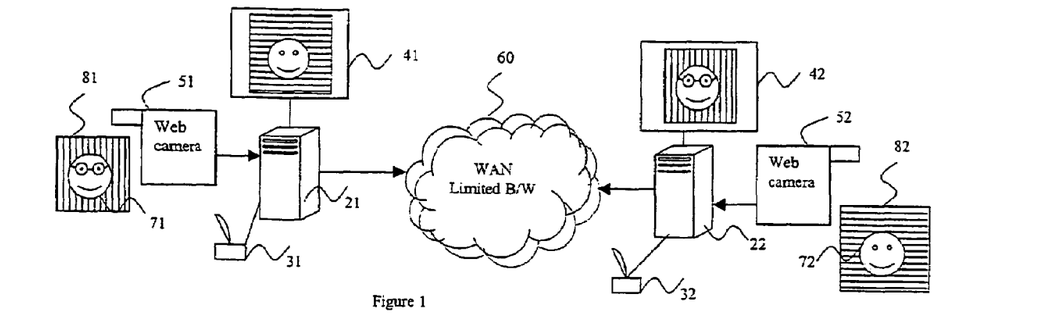
FIG. 1 is a block diagram of a video conference arrangement suitable for use with an embodiment of the present invention.

FIG. 1 is a schematic illustration of a video conference arrangement. In this arrangement, two computer terminals 11, 12 are connected together via a Wide Area Network (WAN) 60 which permits packets of data to be transmitted between the computer terminals 11, 12 using the Internet Protocol, in combination with higher level transport mechanisms such as the Transmission Control Protocol (TCP) and the User Datagram Protocol (UDP). Each computer terminal 11, 12 comprises a processor unit 21, 22, a microphone 31, 32 a monitor 41, 42 and a camera 51, 52.

In order to take part in a video conference with a second user 72, a first user 71 sits in front of the first terminal 11. The microphone 31 and video camera 51 of the first terminal 11 are trained on the first user 71 and record the first user's voice and image respectively. The second user 72 sits in front of the second terminal such that the microphone 32 and video camera 52 of the second computer terminal 12 are trained on the second user for recording his/her voice and image respectively. In addition to the first and second user's image, each video camera also records the backgrounds 81, 82 behind the first 71 and second 72 users respectively. The recorded analogue and video signals are digitised and processed for sending via the WAN 60 according to a suitable protocol such as MPEG-4.

In overview, the present embodiment aims to distinguish between a significant foreground object (ie users 71, 72) and relatively insignificant background objects (ie 81, 82), and to provide updated images only in respect of the significant foreground object. It does this using a shrinking mask technique in which a mask is produced which specifies which macro-blocks within each video frame are to be updated and which are not. The "shrinking" mask assumes that the object of interest will not be ring shaped (ie the part of the mask representing the significant foreground object does not contain holes representing the background). This is a reasonable assumption in most cases and especially in the video conference example illustrated in FIG. 1 (in any event, the process of the present invention would still work with such foreground objects, just with slightly less than maximum efficiency). Additionally, the "shrinking" mask operates according to a step-by-step procedure, described in greater detail below, which makes the process reasonably robust against small errors or changes in background pixels from one frame to the next.

Figure 2:
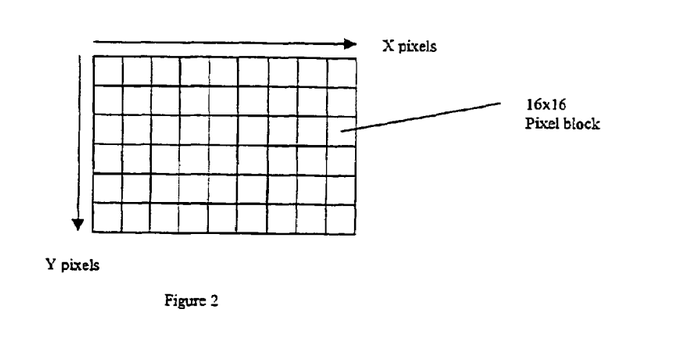
FIG. 2 is a schematic block diagram of a video frame divided into macro-blocks.

Referring now to FIG. 2, each video frame comprises a given number of pixels, which, in the video frame illustrated in FIG. 2 is 96×144=13,824. This is illustrated as forming 6×9=54 macro-blocks 110, each of which contains 16×16=256 pixels. Each pixel has an associated X and Y coordinate; in the example in FIG. 2, the top left pixel has coordinates (0,0) and the bottom right pixel has coordinates (143,95). Thus the X-axis increases from left to right and the Y-axis increases from top to bottom. This is typical for pixel coordinates in video frames.

After some basic processing of the signals output from each camera 51, 52, each processor unit 21, 22 will produce a series of video frames intended to be displayed at a given rate (the refresh rate) to recreate the images recorded by the respective cameras. It is these video frames which provide the input to the process of the present embodiment which is described below in the form of a series of steps. The output of the process is the same video frames together with corresponding mask frames which are used to indicate which macro-blocks within each video frame need to be updated. A subsequent process then encodes and transmits over the WAN 60 only those macro-blocks indicated by the mask frames as requiring updating. The subsequent process may, for example, operate in accordance with the well known MPEG-4 standard. On receiving the macro blocks requiring updating, the receiving computer terminal "reconstructs" a series of video frames which are displayed at the given refresh rate for viewing by the receiving user 72, 71.

The Steps of the Process of the Present Embodiment

The following steps describe the process of the present embodiment:

Step 1

In the first step, the first video frame of the session is selected and a corresponding mask frame (having a macro-block resolution "shrinking" mask) is generated which, because it is the first frame, is automatically set with all of the mask blocks set to a value, which is hereinafter referred to as "transparent", which indicates that the corresponding macro-blocks within the corresponding video frame should be encoded and transmitted. At the same time, a pixel resolution "shrinking" mask is generated; this is for use in steps 15 to 20 (see below); in step 1, as discussed below, this pixel resolution "shrinking" mask is also set to the outer perimeter of the frame size so as to include all possible pixels within the mask.

Step 2

In the second step, the next video frame is selected and a "subtraction operation" is performed on a pixel-by-pixel basis with respect to the preceding video frame (which will be the first frame when step 2 follows step 1, but not in subsequent iterations of the complete loop which loops round from step 2 to step 24 and back again), the output of which is a differentiated frame in which pixels identified as non-differentiated are associated with a first value (eg 0) whilst pixels identified as differentiated pixels are associated with a second value (eg 1).

Note that the "subtraction operation" is used to determine an approximate amount of perceptual difference between the two pixels compared pixels (note the comparison may be done on a pixel by pixel basis or on a group of pixels by group of pixels basis—see below). The exact way in which this is done will depend on the type of coding used to code each individual pixel. In very simple cases each pixel is represented by a number which is correlated to a particular colour using a look-up table. In such cases, the difference between the indexes used to look-up the corresponding colour tends to be related to the perceptual difference in the colour and so a simple subtraction of one pixel value from another can be used. Similarly, in black and white cases, each pixel is represented by a number indicating its grey-scale value and again a simple subtraction will indicate how perceptually different each pixel is from one another. In some colour representations, each of three different components (eg red, green & blue; or Luminance, u-value and v-value; etc.) has an associated number of bits with which to specify a particular value (which may vary from pixel to pixel if chromatic components are sampled less frequently than luminance components for example). In such a case, the subtraction operation may compare like components with like components (on a pixel by pixel basis) and then take an average to determine the overall perceptual difference of one pixel from another.

The aim of the subtraction process is to identify differentiated video areas. A threshold difference is used to avoid small noise causing pixels which are really substantially unchanged from being detected as changed pixels.

In the present embodiment, the process is optimised for colour video frames employing a pixel encoding protocol known as YUV(4:2:0). To avoid complications resulting from the lower levels of sampling of the colour characteristics compared to the luminance of each pixel, only the luminance values are compared between the current and previous video frames. Additionally, to minimise the problems caused by noise affecting only individual pixels (and not their neighbours), the comparison is done on the basis of a group of pixels (which in the present embodiment comprises a square of 2×2 pixels) and the average difference in luminosity per pixel across the group is calculated and compared with the threshold. In the present embodiment, this threshold is set to a default value of 20. This is deemed to be appropriate for YUV (4:2:0) pixel encoding in which the luminosity is encoded using 8 bits (ie to give a luminosity varying between 0 and 255). In an alternative embodiment, different defaults could be used to cater for different types of pixel encoding and the level could be user adjustable to fine tune the threshold depending upon the level of noise, the general brightness of the scene (with brighter scenes having a bigger threshold compared to darker scenes), etc.

As mentioned above, the present embodiment is optimised for processing video sequences containing a single, substantially centrally located, foreground object of interest. Thus the expectation is that the result of the subtraction process, which identifies groups of differentiated pixels (where the differentiation is larger than the threshold value), will be a binary differentiated frame including a representation of the "dynamic object" in the centre of the frame, indicated by the marked differentiated groups of pixels.

Step 3

Figure 3:
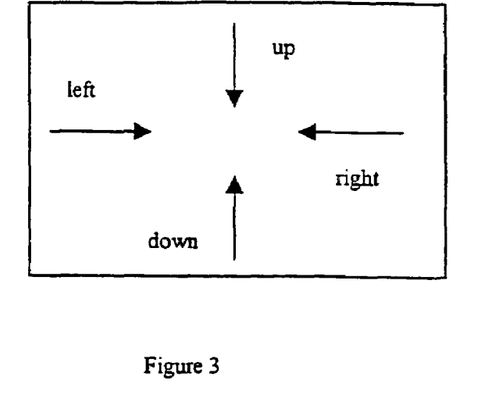
FIG. 3 is a schematic block diagram of a mask frame, illustrating the directions in which a video frame is scanned in the present embodiment to look for the outermost changed video block in each direction.

A differentiated frame corresponding to the result of the subtraction operation performed in step 2 is prepared to be scanned from four different general directions, starting from the boundaries of the differentiated frame and heading towards the centre. The four different directions are from the top, the bottom, the left and the right, as shown in FIG. 3.

Step 4

A maximum distance to be covered in each of the scanning directions from each boundary of the differentiated frame towards the centre is set to avoid overlap and hence possible conflict between scans in opposed directions. These values could take on a range of different numbers depending on the nature of the video sequence. In the present embodiment, however, the following values are used, where X and Y represent the horizontal and vertical dimensions of the differentiated frame in terms of number of pixels:

i) "Up"=Y/2−Y/8
ii) "Down"=Y/2+Y/8
iii) "Left"=X/2−X/8
iv) "Right"=X/2+X/8

These values give rise to a "minimum" mask, because if, in any direction, no differentiated pixel or group of pixels is encountered before reaching the internal boundary set by the above values, then it is assumed that the outermost differentiated pixel in the respective direction is located at this internal boundary.

Figure 4:
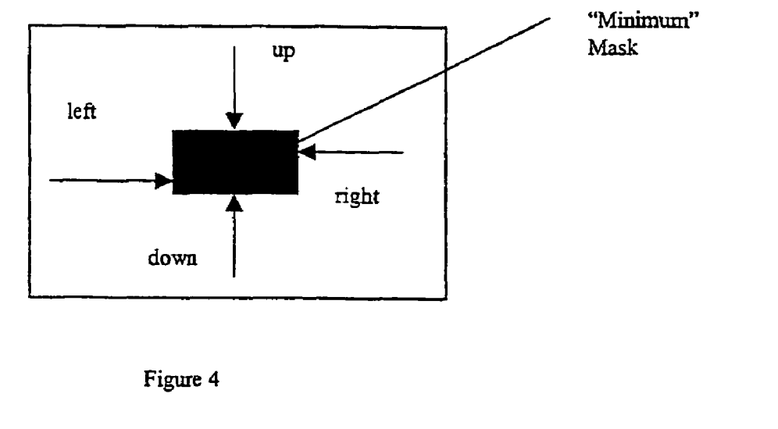
FIG. 4 is a schematic block diagram of a mask frame, illustrating the smallest size of mask which is permitted in the present embodiment.

FIG. 4 illustrates the resulting minimum mask set by the above quoted values used in the present embodiment.

Step 5

Having completed preparations for performing the scanning, the scanning commences and is described in detail below with reference to following steps 6 to 14.

Step 6

Figure 5:
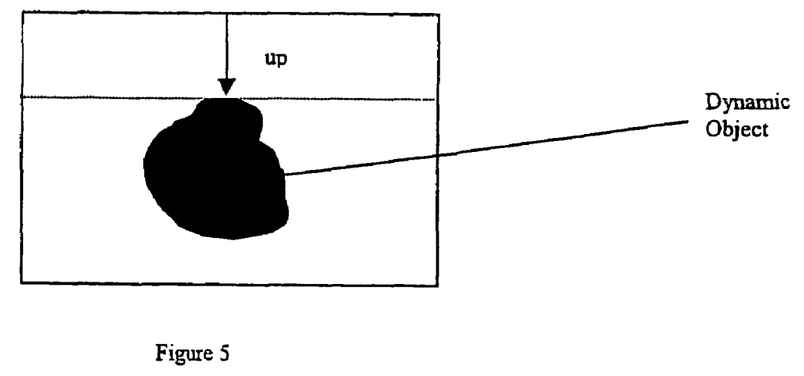
FIG. 5 is a schematic diagram of a video frame illustrating how it is scanned from an upwards direction to locate the most outwardly located changed pixel in the upward direction.

This step involves scanning from the "Up" direction. Starting from the upper-left corner of the differentiated frame and moving towards the right, successive rows are scanned and each pixel is examined to see whether it is a differentiated (ie changed) or an undifferentiated (ie unchanged) pixel. As soon as a differentiated pixel is encountered, the scanning stops and the current row is set as the outer boundary of the "dynamic" object in the Up direction. The value of the current row is stored in a field which, in the present embodiment, is called current_up_limit. This step is illustrated in FIG. 5.

Step 7

Figure 6:
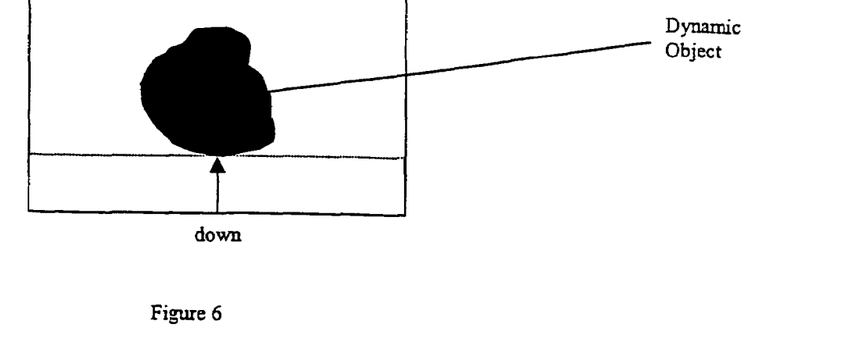
FIG. 6 is a schematic diagram of a video frame illustrating how it is scanned from a downwards direction to locate the most outwardly located changed pixel in the downward direction.

This step is similar to Step 6 above except the scanning is from the "Down" direction and scanning proceeds from the bottom right pixel, from right to left. As soon as a differentiated pixel is encountered, the scanning stops and the row in which it is detected is set as the outer boundary of the "dynamic" object in the Down direction. In the present embodiment, this value is stored in a field called current_down_limit. This step is illustrated in FIG. 6.

Step 8

Figure 7:
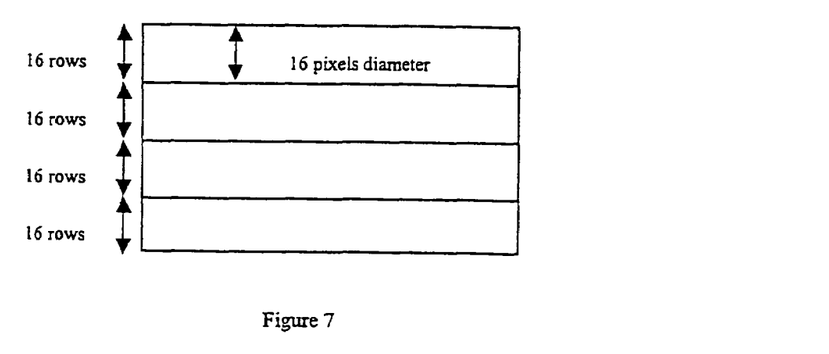
FIG. 7 is a schematic diagram of a video frame illustrating how, in the present invention, each video frame is conceptually divided into rows of one macro-block in height, for subsequent scanning from sideways directions.

Steps 8 to 13 are responsible for performing the scanning in the sideways directions. This is slightly different to the procedures described in steps 6 and 7, because the differentiated frame is first divided horizontally into "slices", each of which has a width equal to the width of a macro-block (ie 16 pixels). Thus each slice contains sixteen rows of pixels. This division into slices is schematically illustrated in FIG. 7.

Step 9

Steps 9 and 10 are responsible for performing the scanning in the "from the Left" direction. Each slice is considered in turn in step 9. If the slice is entirely above the current_up_limit or entirely below the current_down_limit, then the slice is ignored and the next slice is selected. Otherwise, the slice is passed to step 10 for "from the Left" processing.

Step 10

Each slice passed to step 10 for scanning is scanned, on a row-by-row basis, starting from the top left pixel of the slice and moving right until a differentiated pixel is encountered or the left (minimum) internal boundary is reached for that row. The X-coordinate of the first encountered differentiated pixel or the left internal boundary (as appropriate) is stored. This scanning from left to right is repeated for each of the sixteen rows of pixels within the slice to determine the left boundary of the "dynamic object". At the end of this process, all sixteen stored X-coordinates of each row within the slice are compared and the smallest value (ie the left-most differentiated pixel) is recorded in a field which, in the present invention, is called current_left_limit_slice_n, where n represents a number varying from 1 to N, where N is the number of slices in the differentiated frame (ie the left hand edge of the "dynamic object" as detected of the first slice is stored in current_left_limit_slice_1, and of the second slice in current_left_limit_slice_2, etc.). Note that alternative methods could be used to obtain this information; for example, each slice could be scanned an a mini-column by mini-column basis until a differentiated pixel is encountered. However, the presently employed method is preferred because one may, in a more sophisticated embodiment, utilise information about the shape of the left-hand boundary of the dynamic object to discount noisy differentiated pixels, which are much further to the left say than the average position of the left-hand boundary, and thus to get a better fix on the left-hand boundary of the actually sought for "dynamic object", etc.

Step 11

Figure 8:
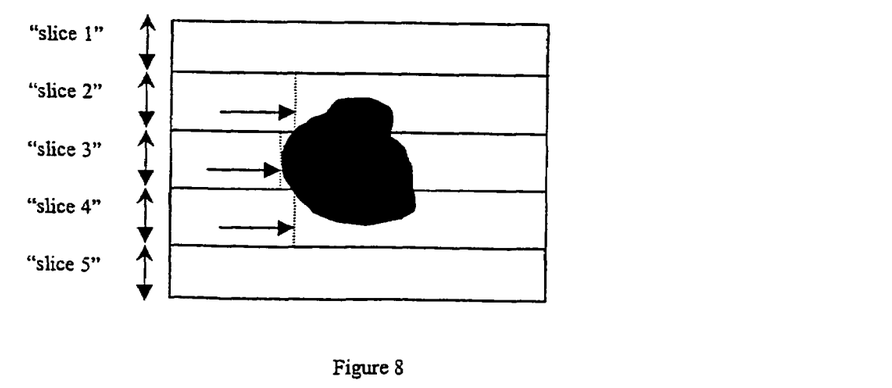
FIG. 8 is a schematic diagram of a video frame illustrating how each row is scanned from the left to locate the most outwardly located changed pixel in the left direction in each row.

If all slices have now been considered in step 9, the process moves on to step 12. Otherwise, control passes back to step 9. The overall effect of steps 9, 10 and 11 is illustrated in FIG. 8.

Step 12

This step corresponds to steps 9 and 10, but for scanning from the Right. Thus each slice is considered. If the slice is entirely above the current_up_limit or entirely below the current_down_limit, then the slice is ignored and the next slice is selected. Otherwise, the slice is scanned, on a row-by-row basis, starting from the top right pixel of the slice and moving left until a differentiated pixel is encountered or the right (minimum) internal boundary is reached for that row. The X-coordinate of the first encountered differentiated pixel or the right internal boundary (as appropriate) is stored. This scanning from right to left is repeated for each of the sixteen rows of pixels within the slice to determine the right boundary of the "dynamic object". At the end of this process, all sixteen stored X-coordinates of each row within the slice are compared and the largest value (ie the right-most differentiated pixel) is recorded in a field which, in the present invention, is called current_right_limit_slice_n, where n represents a number varying from 1 to N.

Step 13

Figure 9:
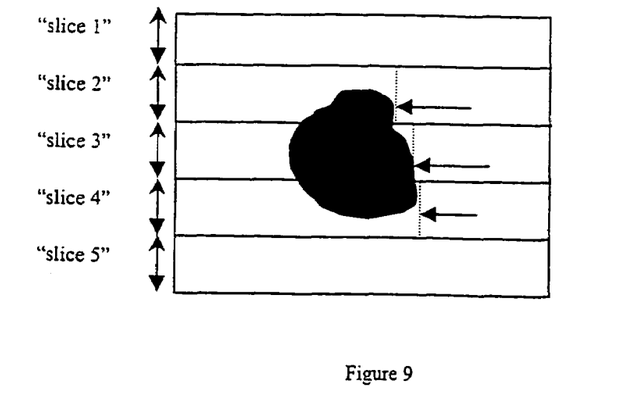
FIG. 9 is a schematic diagram of a video frame illustrating how each row is scanned from the right to locate the most outwardly located changed pixel in the right direction in each row.

Step 12 is repeated until all of the slices in the differentiated frame have been processed. FIG. 9 schematically illustrates the result of steps 12 and 13.

Step 14

At this stage in the process, the following parameters have been calculated:

a) "Up": current_up_limit b) "Down": current_down_limit c) "Left": current_left_limit_slice_1 current_left_limit_slice_2

$\vdots$ current_left_limit_slice_N d) "Right": current_right_limit_slice_1 current_right_limit_slice_2

$\vdots$ current_right_limit_slice_N.

Figure 10:
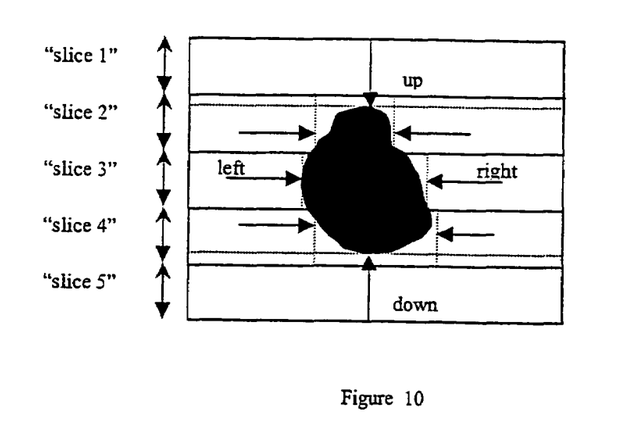
FIG. 10 is a schematic diagram of a video frame illustrating the result of all of the scans illustrated in FIGS. 5, 6, 8 and 9.

These values are schematically illustrated in FIG. 10.

Figure 11:
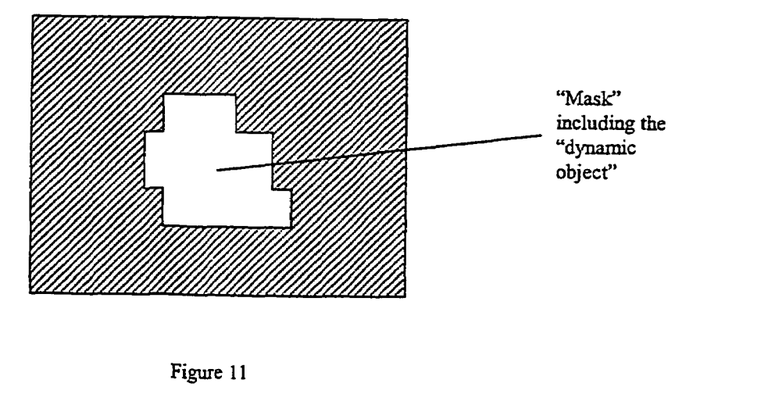
FIG. 11 is a schematic illustration of a video frame, illustrating a high (single pixel) resolution mask formed by amalgamating the results of the scans shown in FIG. 10.

FIG. 11 illustrates a corresponding pixel resolution mask formed from the above set out values. This pixel resolution mask is assumed to envelope the "dynamic object" of interest.

In addition to making available the contents of the above set out fields relating to the current frame, corresponding values of the fields created during the preceding iteration of steps 2 to 24 are also made available for processing during the subsequent steps at this step (step 14). As can be seen from step 21 described below, the past values of these fields are stored in the following fields:

a) "Up": past_up_limit b) "Down": past_down_limit c) "Left": past_left_limit_slice_1 past_left_limit_slice_2

$\vdots$ past_left_limit_slice_N d) "Right": past_right_limit_slice_1 past_right_limit_slice_2

$\vdots$ past_right_limit_slice_N.

Note that in the event that this step has been reached in the first iteration of steps 2 to 24, there will not have been created any previous values for the above set out fields. Therefore, each of the past fields is given an initial default setting which, in the present embodiment, corresponds to the outer boundary of the differentiated frame (see the discussion of setting the pixel resolution "shrinking" mask in step 1 above).

Step 15

In steps 15 to 20, a pixel resolution shrinking mask is set in respect of the current differentiated frame according to the rules set out below, with respect to the past and current values discussed above.

In step 15, a new "Up" limit is determined and stored in the field_final_up_limit.

Rule I) If the absolute value of the difference between the current and the past "Up" limits is less than or equal to 2, then set the final "Up" limit to equal the past "Up" limit. As will be seen below, this effectively results in the past "Up" limit remaining unchanged from one iteration of steps 2 to 24 to the next. This rule can be expressed in pseudo-code as:

IF {abs[(current_up_limit)−(past_up_limit)]≦2}
THEN final_up_limit=past_up_limit Rule II) If the current "Up" limit is more than 2 pixels less than (ie higher than) the past "Up" limit then the final "Up" limit is set to equal the past "Up" limit minus a pre-determined "Up-move-out" amount which, in the present embodiment, is set to an initial default value of 1 pixel. As will be seen below, this effectively results in the past "Up" limit moving vertically upwards by the "Up-move-out" amount from one iteration to the next. This rule can be expressed in pseudo-code as:

IF {(current_up_limit)−(past_up_limit)<2}
THEN final_up_limit=past_up_limit−u p-move-out WHERE up-move-out=1, 2, 3, 4, 5, 6, 7, 8, 9 or 10 (default value is 1)

Rule III) If the current "Up" limit is more than 2 pixels more than (ie lower than) the past "Up" limit then the final "Up" limit is set to equal the past "Up" limit plus a predetermined "Up-move-in" amount which, in the present embodiment, is set to equal the "Up-move-out" amount. This rule can be expressed in pseudo-code as:

IF {(current_up_limit)−(past_up_limit)>2}
THEN final_up_limit=past_up_limit+up-move-in WHERE up-move-in=1, 2, 3, 4, 5, 6, 7, 8, 9 or 10 (default value is 1)

Step 16

This step corresponds to step 15 for the "Down" limit. Thus, expressed in pseudo-code terms only:—

Rule I)
IF (abs[(current_down_limit)−(past_down_limit)]<2)
THEN final_down_limit=past_down_limit Rule II)
IF {(current_down_limit)−(past_down_limit)>2}
THEN final_down_limit=past_down_limit+down-move-out WHERE down-move-out=1, 2, 3, 4, 5, 6, 7, 8, 9 or 10 (default value is 1)

Rule III)
IF {(current_down_limit)−(past_down_limit)<−2}
THEN final_up_limit=past_up_limit−down-move-in WHERE down-move-out=1, 2, 3, 4, 5, 6, 7, 8, 9 or 10 (default value is 1)

In the present embodiment,
down-move-out=up-move-out=down-move-in =up-move-in =1

Step 17

This step corresponds to steps 15 and 16 for the Left direction. This is performed on a slice by slice basis. If a particular slice to be processed is either wholly above the final Up limit calculated in step 15 or wholly below the final Down limit calculated in step 16, then the slice is ignored and the process proceeds to step 18; otherwise one of the following rules (again expressed only in pseudo-code for the sake of brevity) is exercised as appropriate:

Rule I) IF {abst[(current_left_limit_slice_n)−(past_left_limit_slice_n)]≦2}
THEN final_left_limit_slice_n=past_left_limit_slice_n Rule II)
IF {(current_left_limit_slice_n)−(past_left_limit_slice_n)<−2}
THEN final_left_limit_slice_n=past_left_limit_slice_n−left-move-out WHERE left-move-out=1, 2, 3, 4, 5, 6, 7, 8, 9 or 10 (default value is 1)

Rule III)
IF {(current_left_limit_slice_n)−(past_left_limit_slice-n)>2}
THEN final_left_limit_slice_n=past_left_limit_slice-n+left-move-in WHERE left-move-in=1, 2, 3, 4, 5, 6, 7, 8, 9 or 10 (default value is 5 initially)

Note that in the present embodiment, left-move-in # left-move-out=up-move-out.

This has the effect that in the sideways directions, the shrinking mask is able to shrink more quickly than it can expand. This assists the shrinking mask, and thus ultimately the mask frame, to encompass only the dynamic object of interest in a relatively short number of iterations thus reducing the amount of bandwidth required to be sent to transmit the video information. However, once the mask has shrunk to fit the dynamic object, it is no longer necessary to leave the move-in value so high; step 21 below deals with this in the present embodiment.

Step 18

The process is returned to step 17 until all of the slices have been dealt with by step 17. Thereafter, the process moves on to step 19.

Step 19

This step determines the final right limits and corresponds to step 17. As before, this step is performed on a slice by slice basis. If a particular slice to be processed is either wholly above the final Up limit calculated in step 15 or wholly below the final Down limit calculated in step 16, then the slice is ignored and the process proceeds to step 20; otherwise one of the following rules (again expressed only in pseudo-code for the sake of brevity) is exercised as appropriate:

Rule I)
IF {abs[(current_right_limit_slice_n)−(past_right_limit_slice_n)]≦2}
THEN final_right_limit_slice_n=past_right_limit_slice_n Rule II)
IF {(current_right_limit_slice_n)−(past_right_limit_slice-n)>2}
THEN final_right_limit_slice_n=past_right_limit_slice-n+left-move-out WHERE right-move-out=1, 2, 3, 4, 5, 6, 7, 8, 9 or 10 (default value is 1)

Rule III)
IF {(current_right_limit_slice_n)−(past_right_limit_slice-n)<−2}
THEN final_right_limit_slice_n=past_right_limit_slice-n−right-move-in WHERE right-move-in=1, 2, 3, 4, 5, 6, 7, 8, 9 or 10 (default value is 5 initially)

Again, in the present embodiment, right-move-in # right-move-out=up-move-out.

Step 20

The process is returned to step 19 until all of the slices have been dealt with by step 19. Thereafter, the process moves on to step 21.

Step 21

As mentioned above with reference to step 17, once the mask has shrunk to fit around the dynamic object, it is no longer necessary to have the left and right move-in values maintained at a high level. Thus in this step it is determined, in the present embodiment, whether more than a predetermined number of iterations has taken place (which, in the present embodiment is set at 50 iterations) and if so the value for the left and right move-in variables is reduced from 5 to 1. Additionally, in the present embodiment, at this time, the value for the left, right, up and down move-out variables is increased from 1 to 5 at this point to enable the process to react more quickly in the event of an "expansion" of the dynamic object (ie the "region of interest") because, in this case a significant amount of information may be lost (ie not transmitted) if the object moves too quickly outside the borders of the "region of interest". Thus, once the process has shrunk the mask over the dynamic object of interest, the process is able to react faster when one or more of the boundaries of the object are moving towards one or more of the edges of the picture.

Of course, in an alternative embodiment, one or more of the move-out variables could be set a t higher value than the or each corresponding move-in variable right from the start, or after some other predetermined point in the process. Also, instead of simply counting up to a predetermined number of iterations before changing the values of one or more of the move-out or move-in variables, some other indicator could be used to determine when such a change should occur. For example, a reduction in move-in values could be made after a certain (small) number of iterations have happened in which the final pixel resolution limits have remained unchanged from one iteration to the next, etc.

Step 22

In this step, the "final" pixel resolution limit fields are used to generate macro-block resolution boundaries from which a mask frame corresponding to the current video frame is created in the next step. To do this, an inter macro-block boundary is chosen in respect of each of the final limit fields (ie final_up_limit, final_down_limit, final_left_limit_slice__1, final_left_limit_slice__2, . . . , final_left_limit_slice_N, final_right_limit_slice__1, final_right_limit_slice__2, . . . , final_right_limit_slice_N) except that, as per normal, slices either wholly above the final up limit or wholly below the final down limit are ignored. Each inter macro-block boundary is selected by moving away from the centre of the frame from the respective limit value in the respective direction until an inter macro-block boundary is encountered, unless the pixel resolution limit already lies on an inter macro block boundary. The inter macro-block boundaries are inclusive such that in the up direction the top row of pixels in each macro-block represents an inter macro-block boundary, in the right direction the rightmost column of pixels in each macro-block represents the inter macro-block boundary, etc.

Step 23

Figure 12:
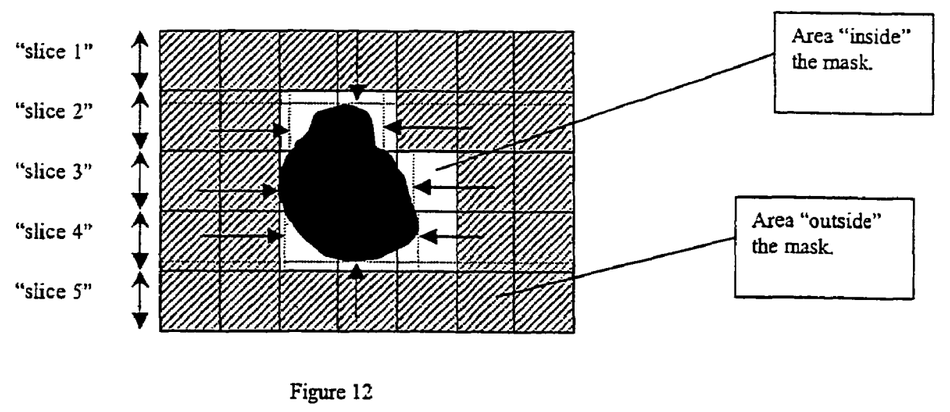
FIG. 12 is a schematic illustration of a mask frame illustrating a low (macro-block) resolution mask, with the object image and high resolution mask superimposed thereon for illustrative purposes.

Having selected a corresponding macro-block boundary in respect of each final pixel resolution limit, a mask frame is generated using the selected macro-block boundaries such that all macro-blocks contained within the selected macro-block boundaries are selected macro-blocks. This is illustrated in FIG. 12.

Step 24

This is the final step in the main iteration. Provided there is at least one more video frame requiring a corresponding mask frame to be generated prior to transmitting the video information, the past limit fields are reset to hold the final limit values (the pixel resolution ones, not the macro-block resolution boundaries used to generate the actual mask frame) (ie set past_up_limit=final_up_limit; etc.). The current video frame is set as the past video frame. The next video frame requiring a mask frame is selected and the process is returned to step 2 to repeat the iteration from steps 2 to 24 with the new video frame.

Further Processing

As mentioned above, the output from the above process will be a series of the originally input video frames together with corresponding mask frames. These can then be provided to a suitable video encoder such as any commercially available video encoder which operates in accordance with a standard such as MPEG-4 which permits objects to be encoded and transmitted without the surroundings.

At the receiver end, a decoder is used which keeps the decoded picture from the previous frame and adds the "new decoded frame" on top of that. In this way, the entire frame will be displayed to the viewer, without him or her noticing that only part of that frame was actually encoded and sent.

The present disclosure also includes the following features as described in the following clauses:

1. A method of transmitting a video sequence across a non-ideal transmission channel in which a distinction is made between a foreground object part and a substantially static background part of each video frame within the sequence and the background part is transmitted at a lower quality than the object part.

2. A method according to clause 1 wherein the background part is transmitted at a lower update rate than the foreground object part.

3. A method of distinguishing between a foreground object part and a substantially static background part of each video frame within a video sequence, the method comprising the steps of:

dividing each video frame into a number of video blocks each of which comprises one or more pixels;

generating a mask frame in respect of each video frame, each mask frame having a mask block corresponding to each video block in the respective video frame; and either setting each mask block to an object value, indicating that the corresponding video block in the corresponding video frame includes one or more pixels depicting a foreground object part, or setting each mask block to another value; wherein a mask boundary is defined in respect of each mask frame such that each mask block within the mask boundary is set to an object value whilst each mask block outside the boundary is set to another value, and wherein the mask boundary position is varied between mask frames, according to a stepped procedure, towards a position in which the boundary just encompasses the foreground object part, of the corresponding video frame, as determined by comparing the corresponding video frame with a substantially temporally adjacent video frame.

4. A method according to clause 3 wherein each video block comprises sixteen by sixteen pixels.

5. A method according to clause 3 or 4 wherein the mask boundary may only be shrunk or expanded between successive mask frames by up to a predetermined maximum amount.

6. A method according to clause 3, 4 or 5 wherein the steps of generating each mask frame and setting each mask block comprise the following sub-steps:

a) selecting a first one of said video frames and setting it to be a past video frame;

b) generating a first mask frame corresponding to said first video frame, setting the first mask frame as a past mask frame and associating it with an initial mask boundary;

c) setting all mask blocks within the initial mask boundary to an object value;

d) selecting a subsequent one of said video frames which is substantially temporally adjacent to said past video frame and setting it as the current video frame;

e) comparing each pixel or group of pixels within said past video frame with each corresponding pixel or group of pixels within said current video frame and marking each pixel or group of pixels of said current video frame which differs from its corresponding pixel or group of pixels in said past video frame by more than a predetermined amount as a changed pixel or group of pixels;

f) determining where the most outwardly located changed pixel or group of pixels in each of a plurality of directed regions is located;

g) setting each portion of a current mask boundary associated with each respective directed region to a position which is either equal to the position of the corresponding portion of the past mask boundary or up to a predetermined maximum integer number of blocks away from the position of the corresponding portion of the past mask boundary towards the corresponding position of the most outwardly located changed video block in the respective directed region in said current video frame;

h) setting all mask blocks in the current mask frame which are located within the current mask boundary to an object value;

i) setting the current video frame and the current mask frame to be the past video frame and past mask frame respectively; and j) repeating sub-steps d) to i) until a mask frame has been generated in respect of each of the video frames in the video sequence.

7. A carrier medium carrying computer processor implementable instructions for causing a computer processor to carry out the method of any one of the preceding claims during implementation of the instructions.

8. A video-conference device including one or more components arranged to perform the method of any of clauses 1 to 6.

9. A device for transmitting a video sequence across a non-ideal transmission channel, the device including means for distinguishing between a foreground object part and a substantially static background part of each video frame within the sequence and means for transmitting the background part at a lower quality than the object part.

What is claimed is:

1. A method of setting a region of interest in each of a sequence of video frames, each video frame comprising a plurality of pixel values, the method including, in respect of each video frame following a predetermined number of initial frames:

generating in respect of each video frame an instantaneous region of interest;

determining whether, and if so to what extent, to modify the region of interest set for the preceding video frame, in order to determine the region of interest for the currently considered video frame, according to a stepped procedure; and setting the region of interest of the currently considered video frame in accordance with the result of the determination performed according to the stepped procedure;

wherein the stepped procedure includes:

(a) comparing a first boundary defining the instantaneous region of interest of the currently considered frame, or sections thereof, with a second boundary defining the region of interest set for the preceding frame, or corresponding sections thereof, and (b) if the difference is greater than a threshold amount, modifying the second boundary, or sections thereof, in the direction towards the first boundary, or the corresponding sections thereof, by an amount which is constrained to be equal to or below a maximum step amount.

2. A method as claimed in claim 1 wherein each video frame is divided into a plurality of blocks each of which comprises one or more pixels, and wherein the set region of interest is set to correspond to a plurality of whole blocks, referred to as blocks of interest, by setting each block which falls on or inside the modified second boundary as a block of interest.

3. A method as claimed in claim 2 further comprising generating a corresponding mask frame in respect of each of the video frames, each mask frame comprising a plurality of block values corresponding to the blocks into which each video frame is divided, and setting each block value to either a block of interest value or another value, depending on whether the corresponding block in the corresponding video frame is a block of interest or not.

4. A method of transmitting a video sequence from a transmitting device to a receiving device across a limited bandwidth connection, the method comprising:

generating a mask frame in respect of each video frame in the sequence according to a method as claimed in claim 3, processing the video frames and the mask frames in accordance with an object based encoding procedure by which objects may be encoded, and decoded at the receiving end, separately from a background part, to generate a plurality of encoded data, and packetizing and transmitting the data across the limited bandwidth connection to the receiving device.

5. A method as claimed in claim 1 wherein an instantaneous region of interest and a modified set region of interest are calculated in respect of the second and each succeeding video frame of the sequence, and wherein a region of interest for the first video frame of the sequence is set to be the entire video frame.

6. A method as claimed in claim 1 wherein the comparison and modification of boundaries is performed on a section by section basis and wherein different maximum step amounts may be set for different sections or groups of sections and/or depending on whether the modification is away from or towards the center of the video frame and/or depending on whether a particular condition has been met or not.

7. A computer readable storage medium containing executable computer processor implementable instructions for causing a computer processor to carry out the method of claim 1 during implementation of the instructions.

8. Apparatus for setting a region of interest in each of a sequence of video frames, each video frame comprising a plurality of pixel values, the apparatus including:

generating means for generating in respect of a video frame an instantaneous region of interest;

determining means for determining whether, and if so to what extent, to modify the region of interest set for the preceding video frame, in order to determine the region of interest for a currently considered video frame, according to a stepped procedure; and setting means for setting the region of interest of the currently considered video frame in accordance with the result of the determination performed by the determination means according to the stepped procedure;

wherein the determining means includes:

(a) comparison means for comparing a first boundary defining the instantaneous region of interest of the currently considered frame, or sections thereof, with a second boundary defining the region of interest set for the preceding frame, or corresponding sections thereof, and (b) modification means for, if the difference is greater than a threshold amount, modifying the second boundary, or sections thereof, in the direction towards the first boundary, or the corresponding sections thereof, by an amount which is constrained to be equal to or below a maximum step amount.

9. Apparatus for transmitting a video sequence across a limited bandwidth connection to a receiving device, the apparatus including:
- apparatus as claimed in claim 8 for setting a region of interest in each of the video frames of the video sequence,
- encoding means for encoding the video sequence in accordance with an object based encoding procedure, wherein the region of interest in each frame is treated as an object and the remainder of each frame is treated as background, and
- transmitting means for transmitting the encoded video sequence across the limited bandwidth connection to the receiving device.

10. A video-conference device including the apparatus of claim 8.

* * * * *